United States Patent
Nair (10) Patent No.: US 11,568,283 B2
(45) Date of Patent: Jan. 31, 2023

(54) ARTIFICIAL INTELLIGENCE ORCHESTRATION LAYER TO FACILITATE MIGRATIONS BETWEEN DIFFERENT ARTIFICIAL INTELLIGENCE PLATFORMS

(71) Applicant: PayPal, Inc., San Jose, CA (US)

(72) Inventor: Rahul Nair, Leander, TX (US)

(73) Assignee: PAYPAL, INC., San Jose, CA (US)

( * ) Notice: Subject to any disclaimer, the term of this patent is extended or adjusted under 35 U.S.C. 154(b) by 330 days.

(21) Appl. No.: 16/900,775

(22) Filed: Jun. 12, 2020

(65) Prior Publication Data

US 2021/0390426 A1 Dec. 16, 2021

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ........... G06N 5/04; G06N 20/00; G06F 40/30
See application file for complete search history.

(56) References Cited

U.S. PATENT DOCUMENTS

| | | | | |
|---|---|---|---|---|
| 10,630,840 | B1* | 4/2020 | Karp | H04M 3/5235 |
| 2018/0293463 | A1 | 10/2018 | Brown | |
| 2019/0130286 | A1* | 5/2019 | Salameh | G06N 5/022 |
| 2019/0281030 | A1 | 9/2019 | Isaacson et al. | |
| 2020/0167631 | A1* | 5/2020 | Rezgui | B25J 9/0084 |
| 2020/0401503 | A1* | 12/2020 | Gao | G06F 11/3672 |

* cited by examiner

*Primary Examiner* — El Hadji M Sall
(74) *Attorney, Agent, or Firm* — Haynes and Boone, LLP (57) ABSTRACT

There are provided systems and methods for an artificial intelligence (AI) orchestration layer to facilitate migrations between different AI platforms. A service provider may provide AI portability functions through an orchestration layer that connects different AI services and platforms. The orchestration layer may be used to monitor user interactions with a first AI platform that request AI predictive services and outputs. Using these monitored interactions, the service provider may build and train a simulated AI model that attempts to mirror or replicate the AI model trained for the user on the first AI platform. Thereafter, when the user begins use of a second AI platform that includes the same or similar functionalities to the first AI platform, the service provider may utilize the orchestration layer to assist in training an AI model on the second AI platform based on the previously trained AI model on the first AI platform.

20 Claims, 6 Drawing Sheets

ARTIFICIAL INTELLIGENCE ORCHESTRATION LAYER TO FACILITATE MIGRATIONS BETWEEN DIFFERENT ARTIFICIAL INTELLIGENCE PLATFORMS

TECHNICAL FIELD

The present application generally relates to training artificial intelligence (AI) models based on past AI predictions and more particularly to an orchestration layer between multiple different AI platforms and systems that monitor past AI interactions and build a simulated AI model based on interactions across different AI platforms.

BACKGROUND

Service providers may provide artificial intelligence (AI) systems and AI models trained for a particular user over time based on training data provided to the AI system. For example, a particular AI platform may be associated with providing natural language processing, automating chat assistance and responses, processing search queries through search engines, performing text and/or image processing and recognition, automating device and/or vehicle operations, and the like. As a user uses the AI system over time, the AI system may become more accurate in making predictions and recommendations or automating operations based on the user's input. For example, a machine learning (ML) and/or neural network system may retrain weights, attributes, and classifiers as the model becomes more sophisticated and has a larger amount of training data for a user. However, when the user moves to a new AI platform and system, the system is required to relearn the specific user's behavior, which leads to less precise performance prior to receiving enough training data. Thus, the AI platform may make incorrect or inaccurate decisions and require the user to go through lengthy input processes to provide sufficient training data to adequately train the AI platform to the user.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for an artificial intelligence (AI) orchestration layer to facilitate migrations between different AI platforms. Systems suitable for practicing methods of the present disclosure are also provided.

A service provider may provide an AI orchestration layer that allows for interoperability and portability of AI models between different AI systems. In this regard, the service provider may allow for training and/or retraining of a new AI model on a new AI platform when the user begins use of the platform, such as when the user initially onboards and requests use of the AI platform for some AI functionality. The service provider's orchestration layer may listen to user interactions with different AI systems and platforms over time, where those platforms each provide AI models based on the user's past interactions and other training data associated with the user's use of the AI platforms. A simulated AI model may be generated by the service provider based on monitoring these interactions through the orchestration layer, including inputs to the AI platform and outputs by the AI platform. Thereafter, when the user wishes to utilize a new AI platform that has some or all of the features of the user's past AI platform(s), the simulated AI model may be used by the service provider as training data and a training AI model for the new platform's AI model. Thus, the service provider may solve issues with migrating training data and AI models between different platforms, which may include different AI algorithms and techniques used to building a particular AI model. This enhances and speeds up AI model training and allows for more precise AI predictions by a new AI platform for a particular user.

In this regard, a service provider, which may provide services to users including electronic transaction processing such as online transaction processors (e.g., PayPal®), may allow merchants, users, and other entities to establish an account to integrate and connect their various AI platforms. A user may interact with the service provider to establish an account and provide other information for the user (e.g., consumer, merchant, service provider, or other entity). In order to utilize the computing services of a service provider, the account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. The service provider may also provide other computing services, including electronic transaction processing, social networking, microblogging, media sharing, messaging, business and consumer platforms, etc. Thereafter, the user may link their account with any online data sources and/or AI platforms that provide AI functionalities to the user so that the service provider may monitor the user's interactions with those AI platforms and provide AI portability between different AI platforms.

The service provider may provide an orchestration layer that allows for interoperability and portability between the different AI platforms for a user, including new AI platforms that the user may onboard with and request AI functionalities. An orchestration layer may correspond to an abstraction layer within connected computing systems, such as disparate systems over a network. For example, the orchestration layer may be used to facilitate connections, data calls, and instructions between different third-party AIs and the service provider. This may also include providing data formatting between these platforms and service providers, as well as request and response merging and routing. In large service provider data systems, AI systems, models, and platforms may be exposed to large amounts of training data and may have access to sufficiently large data sets for one or more users that allows for an AI model to be sufficiently trained, including training for a particular user or group of users and/or for a particular use, project, requirement, or operation. The service provider may integrate with each AI platform so that communications, data, and user interactions may be monitored, and AI portability may be provided to the user between platforms Thereafter, a user may select and/or designate one or more AI platforms that the user utilizes, for example, to receive recommendations, predictions, automated operations, and/or other AI outputs. For example, the service provider may utilize the AI orchestration layer to listen to and monitor user interactions with one or more AI platforms. This may include monitoring user inputs, such as text data, media data, operational data, a search request, a data query, or other user input that a user requests to be processed by an AI platform to provide an AI output. Further, the service provider may monitor outputs by the AI platform based on these inputs, including a risk analysis, operating a computing device, providing a marketplace recommendation, providing a search result, operating a vehicle, or other AI output. Further, when exposed to the orchestration layer, the service provider may also determine additional training data and/or predictions, recommendations, or automated output by the AI platform. The AI platform may utilize an AI model trained based on the inputs, outputs, or other training data for the user to provide AI functionalities that are tailored specifically to the user. Thus, the AI platform's AI model for the user may be specific to that user and allows for more precise or accurate AI outputs for a user. Thus, the service provider may determine the AI outputs that are specific to the user based on that AI platform's trained AI model.

Utilizing the monitored data, the service provider may then build one or more simulated AI models based on the inputs and outputs for a particular AI platform. For example, an AI platform may correspond to an automated chatbot, a search function, a natural language processor, an image recognition operation, an autonomous driving operation, an autonomous device operation, and/or other AI functionalities. The service provider may utilize the inputs, such as the training data, attributes, and other data to train a simulated AI model that provides the same outputs as the AI platform's model that provided the initial recommendation or prediction based on the user's input. For example, the service provider may utilize the past behavior and user interactions (e.g., the past inputs/outputs) of the AI model with the AI model to generate a simulated model by fitting the simulated model's classifiers and corresponding recommendations or predictions to the user inputs to the AI model that caused those outputs.

In some embodiments, where the machine learning, neural network, or other AI algorithms and operations for a particular platform are known to the service provider, the same algorithms may be used to train the simulated AI model using the training data, classifiers, recommendations, and/or other inputs/outputs. In such embodiments, the service provider may also use the same or similar weights and attributes from the input training data to generate the same or similar classifiers and recommendations for the simulated AI model. However, the service provider may utilize other known or proprietary AI algorithms (e.g., supervised or unsupervised machine learning algorithms, neural network algorithms, and the like) to determining weights, attributes, classifiers, and/or output recommendations and predictions to train the simulated AI model with the service provider that correspond to the AI model for the AI platform. Further, the service provider may continue building the model based on additional monitored user interactions (e.g., the inputs and outputs, as well as the classifiers and/or recommendations), as well as retroactively fitting the simulated AI model based on the AI platform's model and past inputs/outputs.

Thereafter, the user may request to migrate to a new AI platform so that the user may utilize the new platform's AI functionality. For example, a second AI platform may provide better or more accurate AI prediction services and/or may be integrated with different or newer devices, systems, or platforms. For example, the user may originally utilize one type of automated vacuum or vehicle with smart AI predictive technology. Similarly, the merchant or other online service provider may originally utilize a first AI platform to automate chatbot experiences and assistance, provide search engine services, predict user intent (e.g., shopping or purchase intents), and the like. When the consumer upgrades to a new vacuum/vehicle or the merchant changes and updates their AI systems and functionalities, the consumer, merchant, or other user may begin utilizing a second AI platform different from the past first AI platform that was previously used. The service provider may therefore provide AI model portability through the orchestration layer, where the service provider may port or migrate the user's past AI data and trained model from the first AI platform to the new second AI platform so that an AI model may be quickly trained for the user and provide more precise or accurate recommendations and predictions. The service provider may first determine the AI functionalities provided by the new second AI platform, such as an automated chatbot, a search function, a natural language processor, an image recognition operation, an autonomous driving operation, an autonomous device operation, and/or other AI functionalities. The service provider may then determine which simulated models built for the user by monitoring the user's interactions with other AI platforms correspond to this functionality. For example, the service provider may identify one or more simulated models with the service provider that provide the automated vacuum/vehicle AI operations or the merchant AI operations.

The service provider may then train the second platform's AI model using the simulated model(s) corresponding to the second platform's AI functionality. Training may be performed through the orchestration layer that connects the different AI platforms and is used to monitor user interactions and other training data with the AI platforms. When training the new AI model on the new second AI platform, the service provider may provide the training data including the inputs, weights, and/or attributes from the first AI platform's model to the second AI platform. Additionally, the service provider may provide the outputs based on the trained classifiers, such as the recommendations, predictions, or other automated output operations to the second AI platform. In some embodiments, the service provider may determine the classifiers and recommendations/predictions for the second AI platform based on the algorithms and techniques used to train the second AI platform's AI model, for example, using the training data inputs/outputs for the first AI platform's AI model and the simulated AI model built by the service provider. However, in other embodiments, the service provider may directly provide the inputs/output and/or simulated AI model to the second AI platform to allow for training of the second AI platform's AI model.

Additionally, the service provider may combine multiple different simulated AI models to train the second AI platform's AI model, for example, where the second AI platform combines multiple different AI functionalities to provide AI services to the user. In such embodiments, the service provider may utilize all or a portion of the simulated AI models for different past AI platforms of the user in order to provide aggregated or combined AI training for the second AI platform. For example, the second AI platform may provide both an AI search engine or search processes, as well as an automated chatbot for responding to user queries and assisting users. Thus, the service provider may select two or more different simulated AI models for the user to train the second AI platform. The service provider may assemble AI functionalities across multiple different AI platforms in order to provide combined training on multiple different types of AI functionalities through the orchestration layer. This may be combined in systems that provide enhanced AI services with multiple different AI functionalities. Further, the service provider may also combine these AI functionalities to provide AI service to users directly through the simulated AI models. For example, the service provider may directly provide two or more AI functionalities to a user using the simulated AI models, such as where the AI platforms may be offline, discontinued, and/or the service provider provides the AI functionalities.

In addition to use the simulated AI models to train additional AI models through the orchestration layer, the service provider may also provide training data and AI services to other online merchants, service providers, and other entities that may have less access to large amounts of training data. For example, large enterprise data systems may have access to large amounts of data, such as customer data for an online transaction processor. However, smaller merchants and payment processors may not have as much training data to accurately provide AI services, such as consumer intent prediction for use in providing predictive AI analysis and recommendations to users. In this regard, the service provider may utilize the orchestration layer to manage and/or provide the training data and/or simulated AI models to the other service providers for use in performing predictive analysis. Where the training data may be provided to train a different service provider and/or AI platform, such as training data having user data and interactions for a plurality of users (including a different user than the one migrating their AI usage), the training data may be scrubbed to remove any personally identifying user data. For example, a name or account identifier may be removed, and/or the age or demographics of the user may be generalized. The service provider may provide the simulated AI models and training data as a fee or subscription service, which may allow different service providers to bid and/or obtain AI functionalities through the simulated models. The service provider may provide for AI portability and AI model training using simulated AI models and training data from past AI interactions without personally identifying users.

Figure 1:
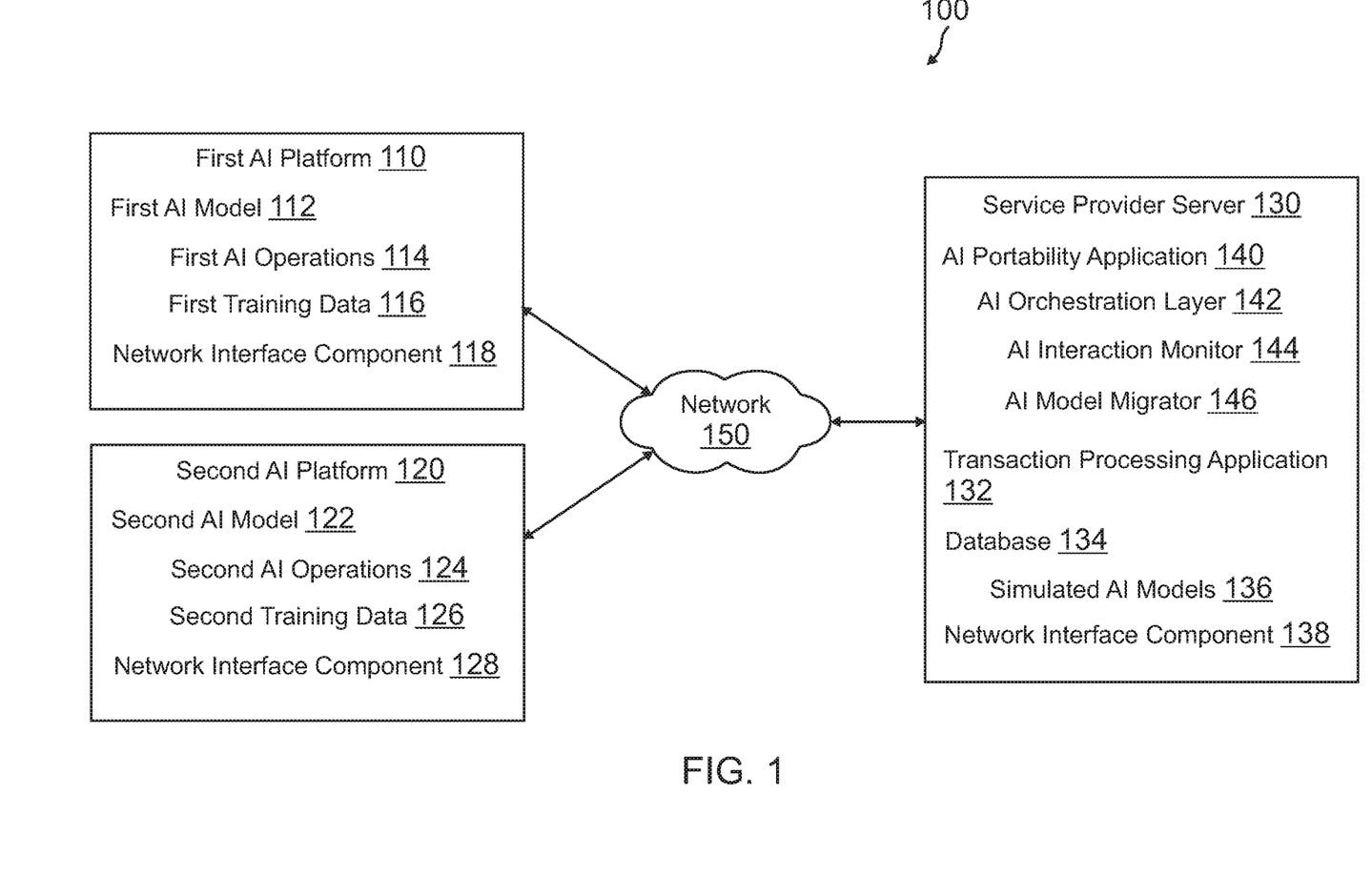
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a first AI platform 110, a second AI platform 120, and a service provider server 130 in communication over a network 150. First AI platform 110 may be utilized by a user to establish, utilize, and train a first AI model 112 that may be used to perform predictive analysis, recommendations, and other predictive outputs based on user inputs and requests. Service provider server 130 may provide various data, operations, and other functions to the user, including providing an orchestration layer that connects multiple different AI platforms, including first AI platform 110 and second AI platform 120. In this regard, service provider server 130 may utilize this orchestration layer to listen for and monitor user interactions and corresponding predictive output by first AI platform 110 to build a simulated AI model that may allow for portability of trained AI models (e.g., first AI model 112) from first AI platform 110 to second AI platform 120 to train a second AI model 122.

First AI platform 110, second AI platform 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

First AI platform 110 may be implemented as a communication device that may utilize appropriate hardware and software configured for wired and/or wireless communication with service provider server 130. For example, in one embodiment, first AI platform 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, autonomous vehicle or device, and/or other types of computing devices capable of performing AI operations and provide AI services to users. In other embodiments, first AI platform 110 may correspond to a server, cloud computing architecture, or other online platform that may provide AI services to users. Although only one device is shown, a plurality of devices may function similarly and/or be connected to provide the functionalities described herein.

First AI platform 110 of FIG. 1 contains first AI model 112 and a network interface component 118. First AI model 112 may correspond to executable processes, procedures, and/or applications with associated hardware. In other embodiments, first AI platform 110 may include additional or different modules having specialized hardware and/or software as required.

First AI model 112 may correspond to one or more processes to execute software modules and associated components of first AI platform 110 to provide AI features, services, and other operations to users, including first AI operations 114 that may be associated with performing a risk analysis, operating a computing device, providing a marketplace recommendation, providing a search result, operating a vehicle or autonomous device, or other AI predictive outputs. In this regard, first AI model 112 may correspond to specialized software utilized by a user of first AI platform 110 to build, train, and utilize one or more AI functionalities. For example, a first user may provide one or more inputs, including text data, media data, operational data, a search request, a data query, or other user input, which may include a request for a predictive output by first AI model 112. These inputs may correspond to user interactions with first AI platform that generate first training data 116.

First training data 116 may be used to train first AI model 112 in order to provide predictive outputs for the user with regard to an AI functionality. Thereafter, when the user provides input, first AI model 112 may execute first AI operations 114 to provide a prediction, recommendation, or other AI output that performs an intelligent decision based on the user's input. The corresponding outputs of first AI model 112 may be output over network 150 using network interface component 118 or may be provided directly to the user using a local communication module, device, or component (e.g., self-operating devices and/or vehicles). Moreover, network interface component 118 may be used to provide the user interactions, including inputs and outputs of first AI model 112, to service provider server 130 for analysis, as well as receive simulated AI models and corresponding data for training and/or retraining of first AI model 112.

First AI platform 110 includes at least one network interface component 118 adapted to communicate with service provider server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Second AI platform 120 may be implemented as a communication device that may utilize appropriate hardware and software configured for wired and/or wireless communication with service provider server 130. For example, in one embodiment, second AI platform 120 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, autonomous vehicle or device, and/or other types of computing devices capable of performing AI operations and provide AI services to users. In other embodiments, second AI platform 120 may correspond to a server, cloud computing architecture, or other online platform that may provide AI services to users. Although only one device is shown, a plurality of devices may function similarly and/or be connected to provide the functionalities described herein.

Second AI platform 120 of FIG. 1 contains second AI model 122 and a network interface component 128. Second AI model 122 may correspond to executable processes, procedures, and/or applications with associated hardware. In other embodiments, second AI platform 120 may include additional or different modules having specialized hardware and/or software as required.

Second AI model 122 may correspond to one or more processes to execute software modules and associated components of second AI platform 120 to provide AI features, services, and other operations to users, including second AI operations 124 that may be associated with performing a risk analysis, operating a computing device, providing a marketplace recommendation, providing a search result, operating a vehicle or autonomous device, or other AI predictive outputs. In this regard, second AI model 122 may correspond to specialized software utilized by a user of second AI platform 120 to build, train, and utilize one or more AI functionalities. The user may correspond to the same user that utilizes or previously utilized first AI platform 110. For example, the user may previously have generated first AI model 112 tailored to the user with first AI platform 110. However, later the user may begin use of second AI platform 120, such as when purchasing a new product, updating their AI needs and functionalities with other devices or servers, and otherwise migrating to a new AI platform. When training second AI model 122, the user may provide one or more inputs, including text data, media data, operational data, a search request, a data query, or other user input, which may include a request for a predictive output by second AI model 122. These inputs may correspond to user interactions with first AI platform that generate second training data 126. Additionally, second training data 126 may also include a simulated AI model, input/outputs from the simulated AI model and/or first AI model 112, and/or other user interactions used to train first AI model 112 with first AI platform 110.

Second training data 126 may be used to train second AI model 122 in order to provide predictive outputs for the user with regard to an AI functionality. Thereafter, when the user provides input, second AI model 122 may execute second AI operations 124 to provide a prediction, recommendation, or other AI output that performs an intelligent decision based on the user's input. The corresponding outputs of second AI model 122 may be output over network 150 using network interface component 128 or may be provided directly to the user using a local communication module, device, or component (e.g., self-operating devices and/or vehicles). Moreover, network interface component 128 may be used to provide the user interactions, including inputs and outputs of second AI model 122, to service provider server 130 for analysis, as well as receive simulated AI models and corresponding data for training and/or retraining of second AI model 122.

Second AI platform 120 includes at least one network interface component 128 adapted to communicate with service provider server 130. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for AI portability, including assisting in AI migration from first AI platform 110 to second AI platform 120 using simulated AI models built through user interactions monitored using an orchestration layer. In this regard, service provider server 130 includes one or more processing applications which may be configured to interact with first AI platform 110 and second AI platform 120 to build these simulated AI models and utilize the models for AI training.

In one example, service provider server 130 may be provided by PAYPAL®, Inc. of San Jose, Calif., USA. However, in other embodiments, service provider server 130 may be maintained by or include another type of service provider.

Service provider server 130 of FIG. 1 includes a AI portability application 140, a transaction processing application 132, a database 134, and a network interface component 138. AI portability application 140 and transaction processing application 132 may correspond to executable processes, procedures, and/or applications with associated hardware. In other embodiments, service provider server 130 may include additional or different modules having specialized hardware and/or software as required.

AI portability application 140 may correspond to one or more processes to execute modules and associated specialized hardware of service provider server 130 to provide AI portability services to users through an AI orchestration layer 142 that may connect multiple different AI platforms and builds simulated AI models 136. In this regard, AI portability application 140 may correspond to specialized hardware and/or software used by service provider server 130 to first connect to and integrate different AI platforms, including first AI platform 110 and second AI platform 120. AI portability application 140 may include an AI orchestration layer 142 that connects multiple different AI platforms through to an abstraction layer within connected computing systems that facilitates connections, data calls, and instructions between different third-party AI products or services (e.g., first AI model 112 and second AI model 122) and service provider server 130. AI orchestration layer 142 may allow for service provider server 130 to stitch together and/or connect multiple different AI functionalities, such as by providing an AI search function, natural language processor, and/or automated smart chatbot functionalities from two or more AI platforms. Further, AI portability application 140 may provide AI portability functions to migrate AI data, training data, and/or AI models between different AI platforms through AI orchestration layer 142.

For example, AI orchestration layer 142 includes an AI interaction monitor 144. AI interaction monitor 144 may correspond to a listening and monitoring operation to detect, record, log, and store user interactions with first AI platform 110 and second AI platform 120. In this regard, a user interaction may correspond to some user input or request from first AI platform 110 and second AI platform 120 that requests an AI output associated with an AI functionality provided by first AI platform 110 and second AI platform 120. Thus, the user interactions may correspond to an input/output set that provides an AI prediction, recommendation, predictive operation, or other AI output. Using this data from AI interaction monitor 144, AI portability application 140 may generated simulated AI models 136 stored by database 134 of service provider server 130. Simulated AI models 136 may therefore correspond to one or more simulated AI models built to perform the same or similar inputs and outputs as first AI model 112 and/or second AI model 122. For example, simulated AI models 136 may correspond to machine learning or neural network models built and trained using the user interactions (e.g., user inputs and AI outputs) monitored by AI interaction monitor 144. Simulated AI models 136 may use the same or different AI algorithms and technique as first AI model 112 and second AI model 122.

For example, simulated AI models 136 may be generated based on training data from monitoring the inputs and outputs of first AI model 112 and/or second AI model 122. When building simulated AI models 136, the training data may be used to generate one or more classifiers and provide recommendation, predictions, or other outputs based on those classifications and an AI model. For example, simulated AI models 136 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train simulated AI models 136.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for simulated AI models 136 that attempt to simulate the corresponding output values of first AI model 112 and second AI model 122. Thus, when simulated AI models 136 are used to perform a predictive analysis and output corresponding to first AI model 112 and second AI model 122, the input may provide a corresponding output based on the classifications trained using simulated AI models 136.

Thus, simulated AI models 136 may be trained by using training data corresponding to the monitored user interactions with first AI model 112 and second AI model 122. By providing training data to AI portability application 140 to train simulated AI models 136, the nodes in the hidden layer may be trained (adjusted) such that an optimal output (e.g., a classification) is produced in the output layer based on the training data. By continuously providing different sets of training data and penalizing simulated AI models 136 when the output of simulated AI models 136 are incorrect, simulated AI models 136 (and specifically, the representations of the nodes in the hidden layer) may be trained (adjusted) to improve its performance in data classification. Adjusting simulated AI models 136 may include adjusting the weights associated with each node in the hidden layer. Further, where the user later onboards with service provider server 130 to generate a simulated AI model based on first AI model 112, simulated AI models 136 may be trained by retrofitting the models based on the currently trained model, inputs, and classifications.

Once simulated AI models 136 have been generated, AI portability application 140 may provide portability functionalities to port or migrate trained AI models and training data particular to a user from one AI platform to another, for example, from first AI model 112 to second AI model 122. Thus, AI model migrator 146 may correspond to an operation and process of AI portability application 140 to provide a simulated AI model from simulated AI models 136, past inputs and outputs to an AI model corresponding to the selected simulated AI model, and/or weights, attributes, classifiers, and/or predictions/recommendations based on the selected simulated AI model. For example, when a user moves from first AI platform 110 to second AI platform 120, or otherwise begins use of second AI platform 120, AI model migrator 146 may be used to determine the AI functionalities that are in common between first AI platform 110 and second AI platform 120. This may include performing a risk analysis, operating a computing device, providing a marketplace recommendation, providing a search result, operating a vehicle or autonomous device, or other AI predictive outputs.

Thereafter, AI model migrator 146 may select one or more of simulated AI models 136 that are the same or similar to this AI functionality shared between first AI platform 110 and second AI platform 120. AI model migrator 146 may then provide corresponding training data from the selected simulated AI model to second AI platform 120 for use in training second AI model 122. This may include the simulated AI model, or training data used to create this simulated AI model (e.g., the original inputs/outputs) and/or derived from this simulated AI model (e.g., the input values, weights, attributes, classifications, and/or recommendations from the different layers of the simulated model). AI model migrator 146 may also be used to perform retrofitting and/or continuous training and fitting of second AI model 122 based on simulated AI models 136. Moreover, if the user continues to use first AI platform 110, AI model migrator 146 may also use a simulated AI model for second AI model 122 to further train and/or retrofit first AI model 112.

Transaction processing application 132 may correspond to one or more processes to execute modules and associated specialized hardware of service provider server 130 to process a transaction, which may be used to process payments, for example, for use of AI portability functions, access and/or bidding on training data, and/or for payments between one or more users or other entities. In this regard, transaction processing application 132 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 130. In some embodiments, the financial information may also be used to establish a payment account and provide payments through the payment account. The payment account may be accessed and/or used through a browser application and/or dedicated payment application, which may include AI functionalities provided by first AI platform 110 and/or second AI platform 120, including use of simulated AI models 136 to provide the AI functionalities. Transaction processing application 132 may process the payment and may provide a transaction history for transaction authorization, approval, or denial.

Additionally, service provider server 130 includes database 134. Database 134 may store various identifiers associated with first AI platform 110 and second AI platform 120. Database 134 may also store account data, including payment instruments and authentication credentials, as well as transaction processing histories and data for processed transactions. Database 134 may store financial information and tokenization data, as well as transactions, transaction results, and other data generated and stored by transaction processing application 132. Additionally, data generated by AI portability application 140 may be stored by database 134, such as simulated AI models 136, as well as identifiers, communication mechanisms (e.g., encryption keys), and other data utilized for AI orchestration layer 142 to connect with different AI platforms.

In various embodiments, service provider server 130 includes at least one network interface component 138 adapted to communicate first AI platform 110 and second AI platform 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
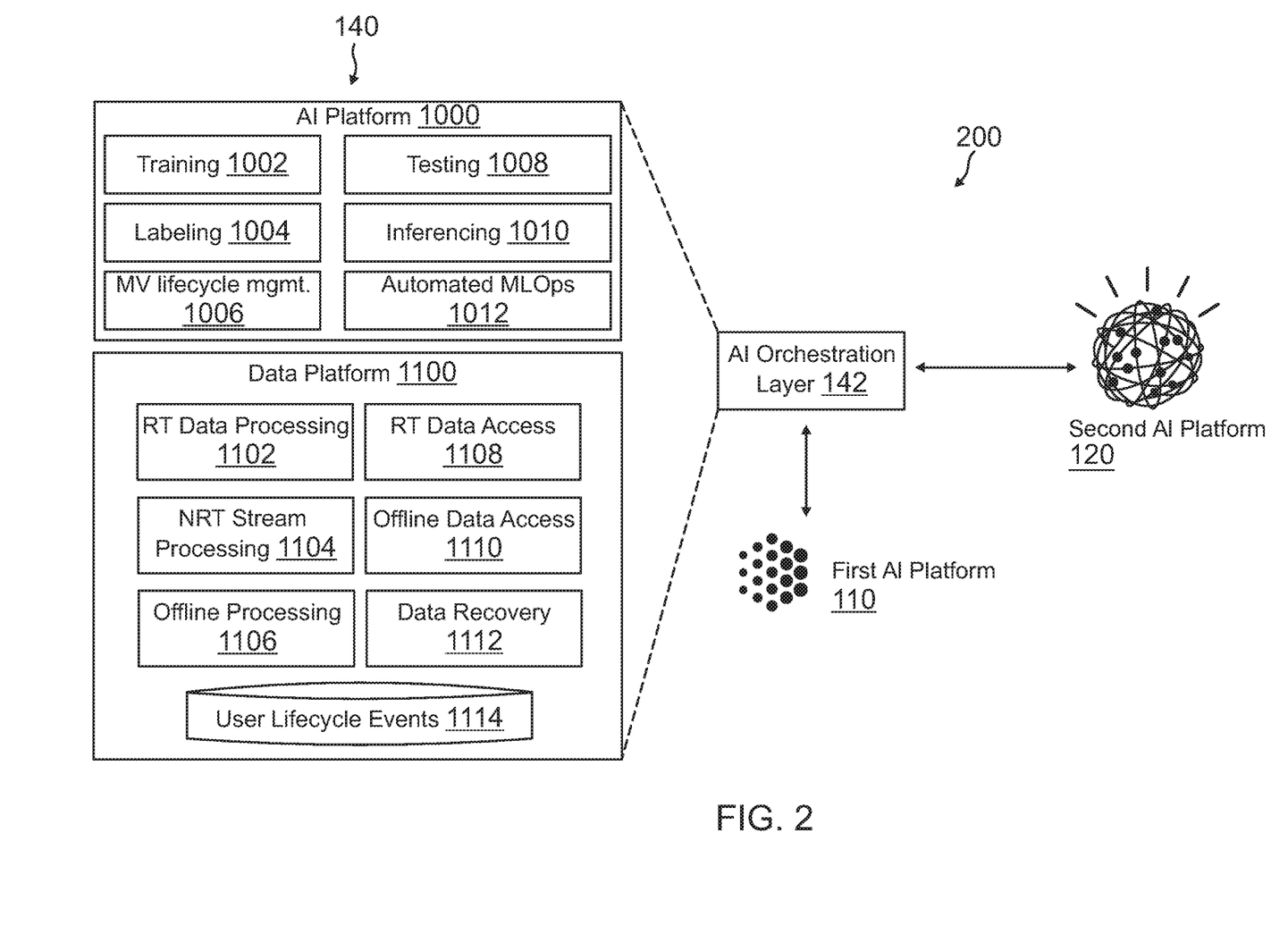
FIG. 2 is an exemplary block diagram of an AI orchestration layer between different AI systems, according to an embodiment.

FIG. 2 is an exemplary block diagram 200 of an AI orchestration layer between different AI systems, according to an embodiment. Diagram 200 of FIG. 2 includes an AI orchestration layer 142 interacting with first AI platform 110 and second AI platform 120 discussed in reference to system 100 of FIG. 1. In this regard, diagram 200 includes the operations and components of AI portability application 140 and AI orchestration layer 142 for service provider server 130 from system 100, which may be used to communicate with and connect first AI platform 110 and second AI platform 120 to provide AI portability operations.

In this regard, orchestration layer 142 may monitor first AI platform 110 over a period of time to determine user interactions with first AI platform 110 that utilize AI services and operations of first AI platform 110. During monitoring of first AI platform 110, AI orchestration layer 142 may provide information to AI portability application 140, which may utilize an AI platform 1000 and a data platform 1100 to generate and build training data, as well as train simulated AI models for first AI platform 110. AI platform 1000 may therefore interact with data platform 1100 in order to perform the building of the simulated AI models, which may then be used to migrate AI data and models for a specific user from first AI platform 110 to second AI platform 120. For example, data platform 1100 may include operations to gather data from first AI platform 110, including operations for data processing of events and user interactions with first AI platform 1100. These operations for data processing of user interactions (e.g., user input and corresponding AI output) include real-time data processing 1102, nonreal-time stream processing 1104, offline processing 1106, real-time data access 1108, offline data access 1110, and data recovery 1112.

For example, real-time data processing 1102, nonreal-time stream processing 1104, and offline processing 1106 may correspond to data processing operations to detect user interactions and their corresponding inputs and outputs so that a particular input to an AI model may be correlated to an output of the AI model. This may be utilized to determine what the particular training data and output classifications for recommendations and predictions are for an AI model with first AI platform 110. For example, the training data may be utilized for a supervised machine learning algorithm by fitting the corresponding input to the output decided by first AI platform 110 based on the input. Further real-time data access 1108, offline data access 1110, and data recovery 1112 may be used to access, receive, and/or recover the data utilized by real-time data processing 1102, nonreal-time stream processing 1104, and offline processing 1106. Data platform 1100 may also include user lifecycle events 1114 that may correspond to lifecycle events that occur as a user utilizes first AI platform 110, including updates, AI model states, user configurations, changes in user data or information, and/or user onboarding/leaving use of an AI platform.

Thereafter, AI platform 1000 may utilize data platform 1100 to execute one or more operations to determine a simulated AI model for the model trained on first AI platform 110. AI platform 1000 includes operations for training 1002, labeling 1004, MV lifecycle management 1006, testing 1008, inferencing 1010, and automated machine learning operations (MLOps) 1012. When building a simulated AI model, training 1002 may include training the different nodes in the hidden layers based on the desired output for a particular input, where the desired output in the simulated AI model would be the same or similar decision or prediction as those made in the user interactions monitored from first AI platform 110. For example, training 1002 may be performed based on the input-output pairs in data platform 1100 that are determined when AI orchestration layer 142 monitored first AI platform 110. These input-output pairs correspond to user interactions where the user performed a request or action and the AI model for first AI platform 110 provided an AI predictive output. Thus, training 1002 may be utilized with labeling 1004 that includes labels for particular data, events, and inputs/outputs within the training data. Labeling 1004 may be used to train an AI model, for example, using a supervised machine learning algorithm with labeled training data sets.

Further, MV lifecycle management 1006 may provide information and management associated with model verification. Once a simulated AI model is generated, additional operations may be utilized to ensure the validity and proper predictive operations of the simulated AI model. For example, testing 1008 may be utilized to test the model and provide further feedback in order to refine the model. Testing may also include a backward pass from the last layer to the first layer to perform recalculation of the weights. Inferencing 1010 may utilize the trained AI model simulating first AI platform 110 to predict certain output values. This may include a forward pass through the layers to form so prediction and determine whether the prediction corresponds to the correct classification based on the labeled training data. Additionally, automated MLOps 1012 may correspond to operations to unify the development and testing of the simulated AI models with the AI operational systems. This may include coordinating with different users and entities in order to properly implement the simulated AI models in a production environment.

Figure 3A:
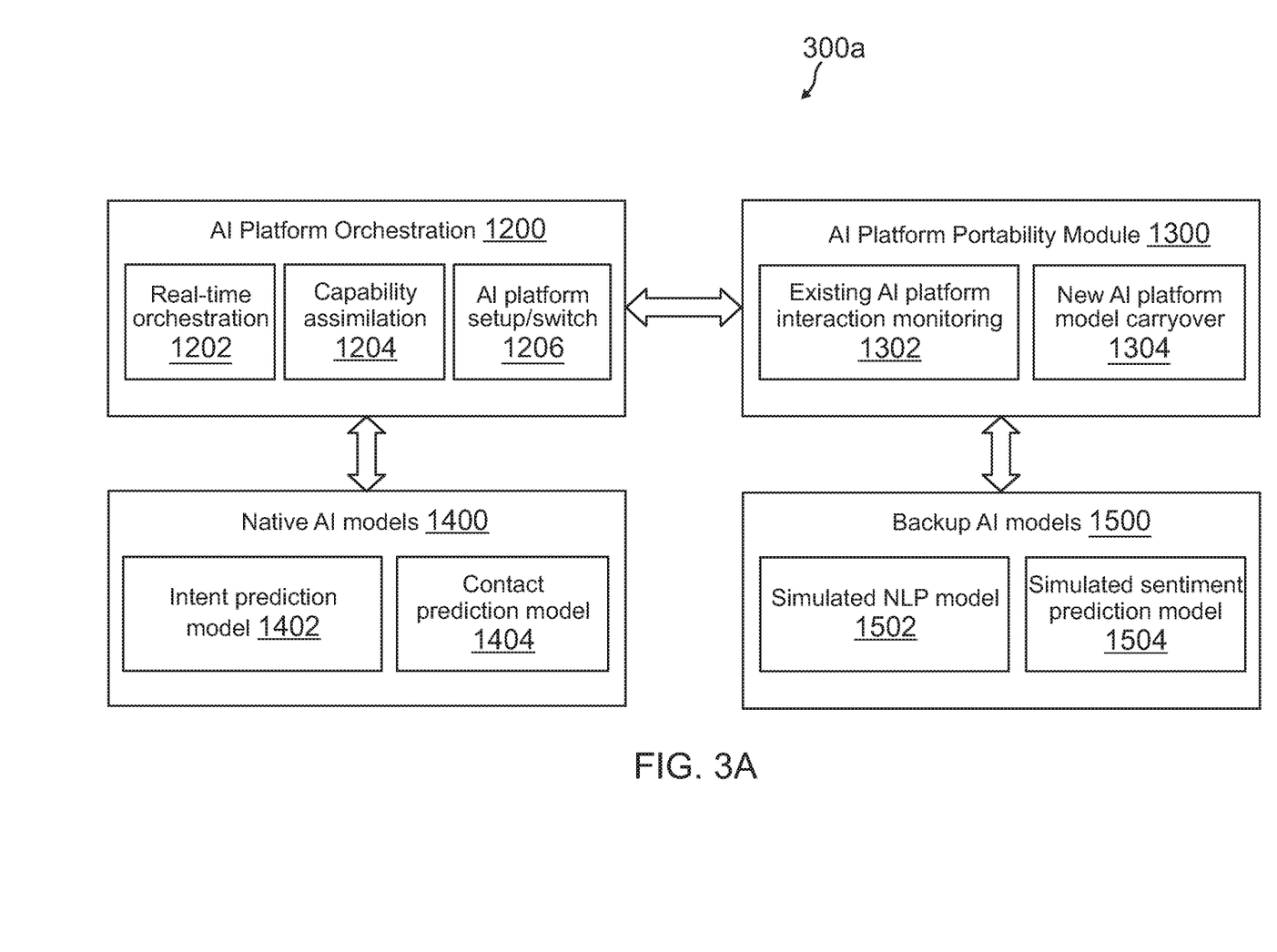
FIG. 3A is an exemplary environment displaying interactions between AI platforms to migrate a user's AI model from one platform to another platform, according to an embodiment.

FIG. 3A is an exemplary environment 300a displaying interactions between AI platforms to migrate a user's AI model from one platform to another platform, according to an embodiment. Environment 300a includes operations and components implemented and executed by AI portability application 140 of service provider server 130 discussed in reference to system 100 of FIG. 1. In this regard, AI portability application 140 may operate within environment 300a to interact with different AI platforms for native AI models 1400 to generate backup AI models 1500.

In environment 300a, AI platform orchestration 1200 may correspond to operations to connect with, monitor, and/or interact with one or more of AI platforms corresponding to native AI models 1400. In this regard, AI platform orchestration 1200 includes real-time orchestration 1202, capability assimilation 1204, and AI platform setup/switch 1206. Real-time orchestration 1202 may be utilized to perform orchestrations between different AI platforms and a service provider, such as service provider server 130. AI platform orchestration 1200 further includes capability assimilation 1204 that may be utilized to bring together and/or combine one or more of native AI models 1400, as well as provide use of backup AI models 1500 with native AI models 1400 to provide additional AI functionalities during real-time orchestration 1202.

AI platform orchestration 1200 may therefore be in communication with native AI models 1400 to provide data to AI platform portability model 1300 in order to train backup AI models 1500. For example, real-time orchestration 1202 of AI platform orchestration 1200 may be used to facilitate connections, data calls, and instructions between the AI platforms and the service provider. Further, real-time orchestration 1202 may be used by an existing AI platform interaction monitoring 1302 of AI platform portability module 1300 for monitoring and listening for user interactions, including inputs and outputs, to native AI models 1400. Thus, as a user utilizes intent prediction model 1402 and/or contact prediction model 1404 for native AI models 1400, existing AI platform interaction monitoring 1302 may use real-time orchestration 1202 to receive the user interaction data and other AI service use data to AI platform portability module 1300 in order to generated backup AI models 1500.

For example, intent prediction model 1402 may correspond to an AI model that provides intent prediction, such as using a natural language processor (NLP) trained using one or more AI algorithms and techniques. Similarly, contact prediction model 1404 may correspond to an AI model that provide sentiment prediction using an AI model trained using one or more AI algorithms and techniques. Thus, the user may utilize native AI models 1400 during the course of use of one or more AI platforms to receive predictive analysis and output, where AI platform orchestration 1200 may monitor and track this data for AI platform portability module 1300. Thereafter, existing AI platform interaction monitoring 1302 of AI platform portability module 1300 may assist in building simulated NLP model 1502 and simulated sentiment prediction model 1504. For example, simulated NLP model 1502 may be built and trained based on the interactions the user has with intent prediction model 1402 that were monitored by existing AI platform interaction monitoring 1302. Similarly, simulated sentiment prediction model 1504 may be built and trained based on interactions the user has with contact prediction model 1404 that were monitored by existing AI platform interaction monitoring 1302. In some embodiments, backup AI models 1500 may be continuously trained using monitored data from existing AI platform interaction monitoring 1302 or may be retrofitted and trained based on past inputs/outputs.

Once backup AI model 1500 have been trained, validated, and/or otherwise verified for predictive analysis and AI output, AI platform portability module 1300 may be used to perform a new AI platform model carryover 1304, which allows for carrying over or migrating AI data and trained models for the user from one platform to another. For example, the user may move to a new AI platform from a past AI platform, where the new AI platform may not have been exposed to the previous user interactions, requests, and other inputs (e.g., training data) that the user provided to the past AI platform. Thus, the user may receive less precise or accurate AI predictions and AI output as the new platforms AI model is not trained for the particular user's information, habits, preferences, and/or other parameters.

In this regard, new AI platform carryover 1304 provides an operation to utilize one or more of backup AI models 1500 to train a new AI model on the new AI platform. For example, new AI platform model carryover 1304 may determine the capabilities and functionalities of the new AI platform and the AI model the user wishes to train. New AI platform model carryover 1304 may then select one or more of backup AI models 1500 that corresponds to these capabilities and functionalities, such as by providing the same or similar AI service. Thereafter, new AI platform model carryover 1304 may interact with AI platform setup/switch in order to facilitate training an AI model on the new AI platform. This may include providing one or more of backup AI models 1500 to the new AI platform, or may provide training data, including inputs, outputs, attributes and weights for different layer nodes, classifiers, and/or predictions/recommendations. For example, a classifier and a recommendation for a particular input (e.g., what the AI output is for a particular user input) may be used as training data for the new AI model. AI platform setup/switch 1206 may therefore be used to provide this training data and/or simulated AI model to the new platform, as well as train the model by providing training data and feedback on model prediction based on the training data.

Figure 3B:
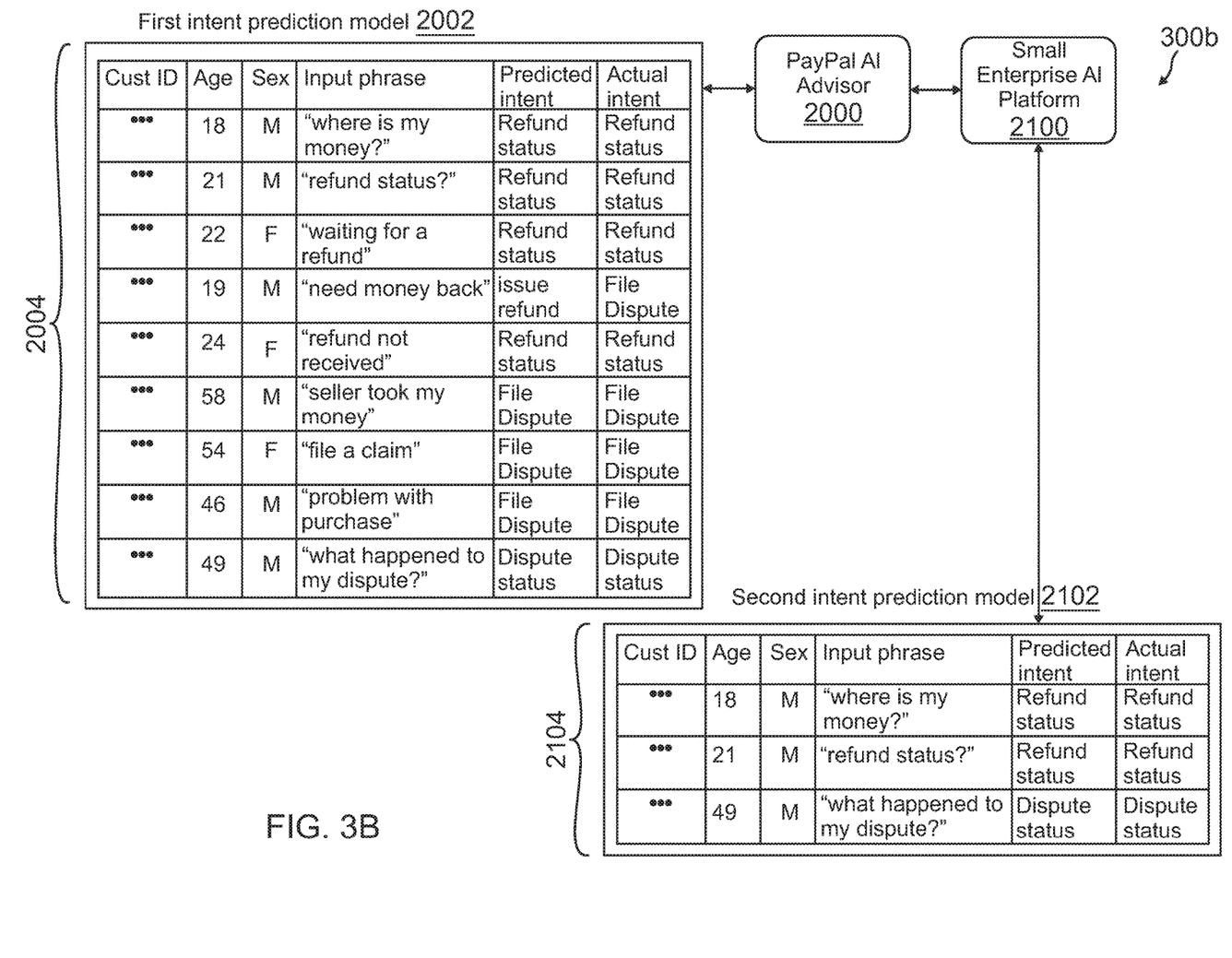
FIG. 3B are exemplary intent prediction datasets from a first AI platform that may be migrated to or used as training data for another AI platform, according to an embodiment.

FIG. 3B are exemplary intent prediction datasets 300*b* from a first AI platform that may be migrated to or used as training data for another AI platform, according to an embodiment. Intent prediction datasets 300*b* includes a first intent prediction model 2002 and a second intent prediction model 2102 that correspond to different data sets based on different organizational or enterprise size. For example, first intent prediction model 2002 may correspond to a large enterprise system that may include large and diverse records utilized to training an AI model. Conversely, second intent prediction model 2102 may correspond to a small enterprise system that may have a smaller and less diverse records within their dataset used to train an AI model. Thus, intent prediction datasets 300*b* displays an exemplary scenario where the large enterprise data system may provide training data to the smaller enterprise, for example, to further build an AI model, including user-specific AI models.

In FIG. 3B, an advisor 2000 may be associated with first intent prediction model 2002 that includes labeled training data 2004 and corresponding results based on training an AI model. A small enterprise AI platform 2100 may be associated with second intent prediction model 2102 that includes their smaller dataset of labeled training data 2104 and corresponding results based on training an AI model. In this regard, as small enterprise AI platform 2100 trains their AI model for intent prediction, they may have less data and therefore perform less precise or accurate predictive analysis and output or may be unable to process certain inputs that their small enterprise AI model (e.g., second intent prediction model 2102) has not yet been exposed to and processed to determine a corresponding AI output. As such, small enterprise AI platform 2100 would benefit from labeled training data 2004 that may be used to enhance labeled training data 2104 and further train second intent prediction model 2102.

Thus, advisor 2000 may expose all or part of labeled training data 2004 to small enterprise AI platform 2100, as well as first intent prediction model 2002 that performs the predictive analysis for labeled training data 2004. This may include providing or exposing first intent prediction model 2002 and/or labeled training data 2004 via an orchestration layer that allows linking and connectivity between first intent prediction model 2002 for advisor 2000 and second intent prediction model 2102 for small enterprise AI platform 2100. Thus, small enterprise AI platform 2100 may further add to labeled training data 2104 for second intent prediction model 2102 using first intent prediction model 2002 and/or labeled training data 2004 from advisor 2000. In certain embodiments, usage of first intent prediction model 2002 and/or labeled training data 2004 may include fee requirements and/or marketplace bidding in order to purchase usage rights for the corresponding data. This may also be utilized to enhance particular users' data and further train a model, for example, where instead first intent prediction model 2002 and/or labeled training data 2004 may be particular to a certain user. Prior to providing labeled training data 2004, however, advisor 2000 may scrub identifying data from labeled training data 2004. For example, customer IDs are shown as scrubbed in FIG. 3B and removed so that particular user's data is not shared without their authorization and those users may be identified. Further, other information may be generalized, such as by placing users in age groups or demographics instead of revealing age, sex, location, ethnicity, and the like.

Figure 4:
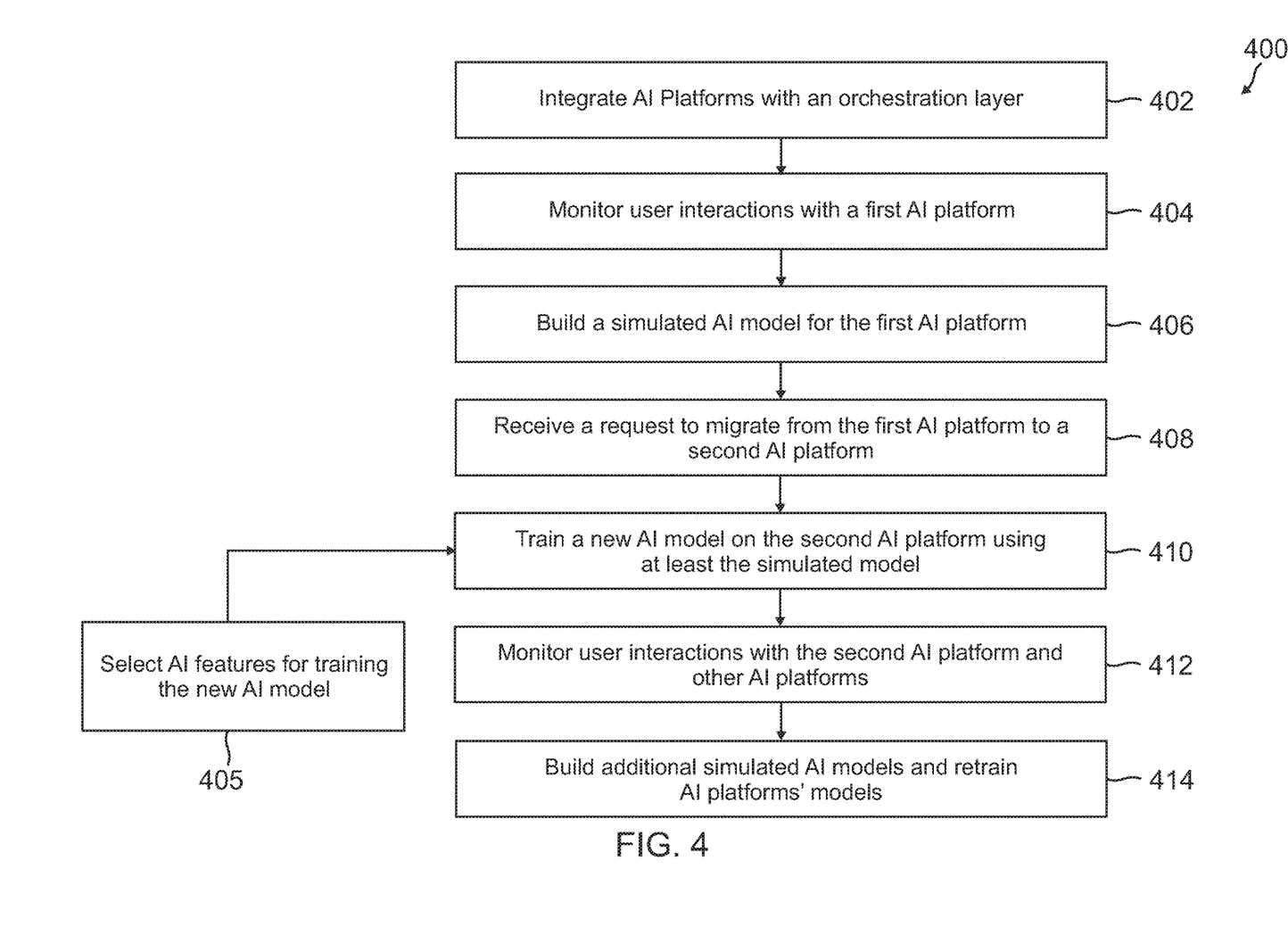
FIG. 4 is a flowchart for an artificial intelligence (AI) orchestration layer to facilitate migrations between different AI platforms, according to an embodiment.

FIG. 4 is a flowchart 400 for an artificial intelligence (AI) orchestration layer to facilitate migrations between different AI platforms, according to an embodiment. Note that one or more steps, processes, and methods described herein of flowchart 400 may be omitted, performed in a different sequence, or combined as desired or appropriate.

At step 402 of flowchart 400, AI platforms are integrated with an orchestration layer of a service provider. For example, the service provider may provide an AI orchestration system that includes an abstraction layer built to connect with and communicate application programming interface (API) calls, including read requests, write requests, and the like. The orchestration layer allows for sending, receiving, monitoring, translating, or otherwise utilizing data from different AI platforms. Once the different AI platforms are onboarded with the service provider an orchestration layer, at step 404, user interactions with a first AI platform are monitored. The user interactions may correspond to inputs and outputs for the first AI platform, which may correspond to the user's request or initial data input, which is processed by the first AI platform to provide some AI service and/or functionality to the user, such as providing a risk analysis, operating a computing device, providing a marketplace recommendation, providing a search result, or operating a vehicle. Thus, the user's input may correspond to text data, media data, operational data, a search request, or a data query.

Based on the monitoring, at step 406, a simulated AI model for the first AI platform is built. The simulated AI model may be trained and built in order to mirror, mock, or otherwise replicate the decision-making operations of the AI model with the first AI platform. The simulated AI model may therefore be trained using a labeled training data having the inputs provided by the user to the first AI platform and the corresponding outputs and classifications, as well as other recommendations or predictions, from the first AI platform. Further, the simulated AI model may be trained using the same or similar machine learning or neural network algorithm and/or technique in order to more closely approximate the decision-making of the first AI platform. When training the simulated AI model, the model may continuously be trained using incoming real-time or streamed user interactions or may be retrofitted using past data and user interactions with the first AI platform.

After the simulated AI model is built for the first AI platform, the user may later move to a new second AI platform, which may have corresponding AI functionalities and capabilities of the first AI platform. Thus, at step 408, a request to migrate from the first AI platform to a second AI platform is received. The request to migrate may occur when the user begins use of the second AI platform and/or after use of the second AI platform when the user would like to further revise and refine the precision of the predictive capabilities of the second AI platform. Thus, a new AI model is trained on the second AI platform using at least the simulated AI model, at step 410. The new Ai model may be trained by providing the simulated AI model to the second AI platform and/or processing a data set by simulated AI model to provide a set of inputs, attributes and weights, outputs, classifications, and/or recommendations. This may correspond to a training data set and may be the inputs/outputs used to train the simulated AI model or another data set, such as a new or live data set, to determine the predictions and recommendations the simulated AI model may make based on different inputs. Thus, the second AI model may be tuned and adjusted to the particular user based on the simulated AI model that attempted to replicate the past AI model of the first AI platform.

In some embodiments, prior to step 410, AI features for training the new AI model are selected, at step 405. For example, the service provider and/or the user may select which AI features from different models are to be used to train the new AI model with the second AI platform. This may include bringing together AI functionalities from multiple different platforms and models to provide a desired AI functionality and/or combine different Ai functionalities. Once the new AI model is trained, at step 412, user interactions with the second AI platform and other AI platforms are continued to be monitored. This may include further listening for inputs and outputs to multiple different AI models, which may generate additional model training data. Using this data, at step 414, additional simulated AI models are built and used to retrain different AI platforms' models. This allows for further refining, and making more precise, different AI models with different AI platforms by utilizing a large source of training data.

Figure 5:
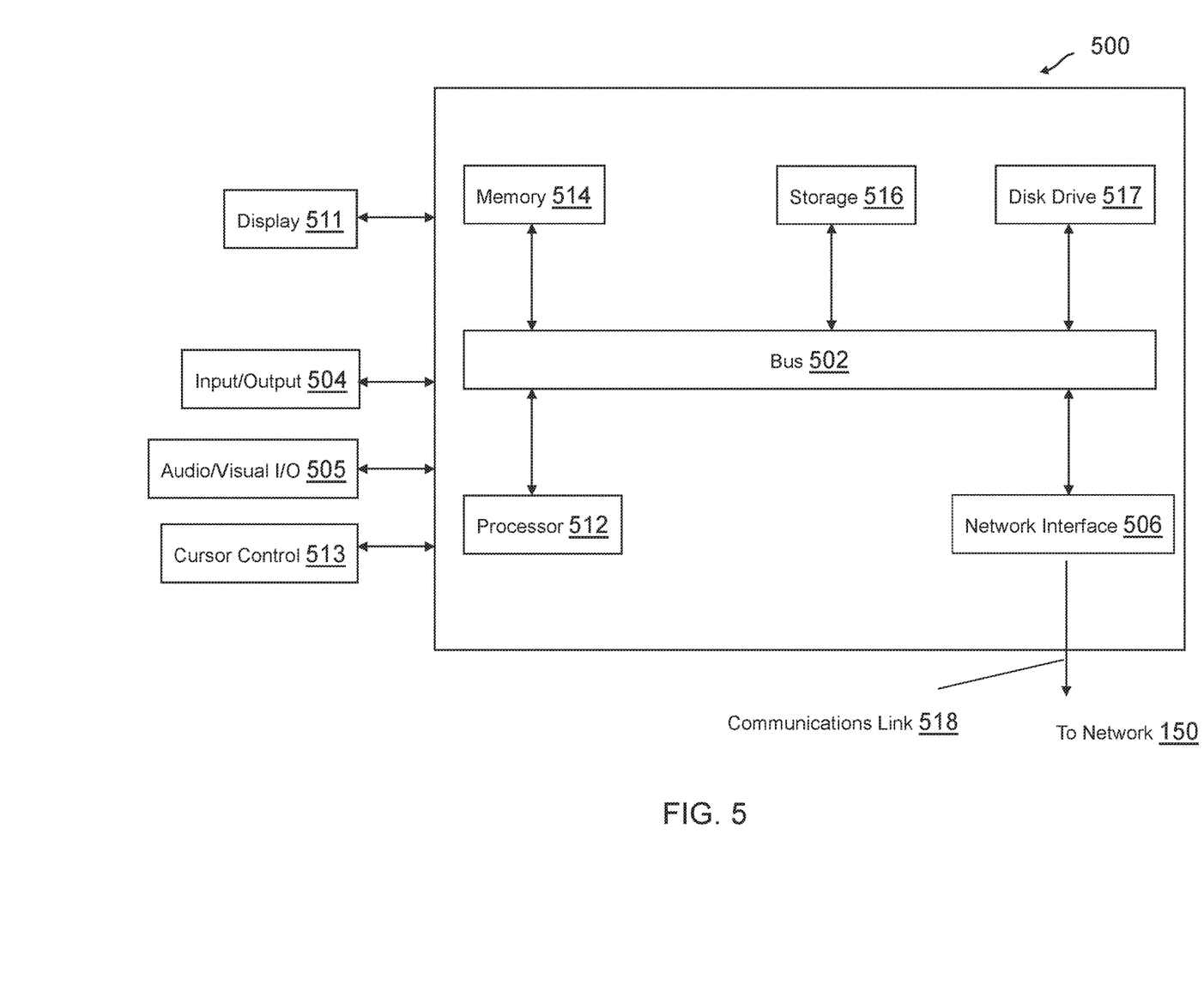
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      receiving, from a first computing device, a request to transition from a first artificial intelligence (AI) platform previously used by a first user of the first computing device to a second AI platform;
      in response to receiving the request, determining a simulated AI model for the first AI platform based on past input data to the first AI platform and past output data by the first AI platform in response to the past input data;
      determining, based on the simulated AI model, a first classifier and a first recommendation based on the first classifier for the second AI platform; and
      training a second platform AI model with the second AI platform using the first classifier and the first recommendation.

2. The system of claim 1, wherein the receiving the request and the training the second platform AI model is performed via an orchestration layer for the system that is in communication with the first AI platform and the second AI platform, and wherein prior to the receiving the request, the operations further comprise:
   building, via the orchestration layer, the simulated AI model over a time period based on the past input data and the past output data.

3. The system of claim 2, wherein the building is further based on user interactions by the first user with the first AI platform over the time period, and wherein the user interactions comprise decisions made by the first AI platform using a first platform AI model trained based on the past input data.

4. The system of claim 2, wherein the orchestration layer further manages additional user interactions between a plurality of AI platforms including the first AI platform and the second AI platform, and wherein the orchestration layer is further in communication with a data center comprising a plurality of simulated AI models for the plurality of AI platforms.

5. The system of claim 1, wherein the training the second platform AI model further comprises:
   determining at least one additional simulated AI model associated with at least one additional AI platform; and
   providing additional feature training for a portion of the second platform AI model using the at least one additional simulated AI model.

6. The system of claim 1, wherein the past input data comprises at least one of text data, media data, operational data, a search request, or a data query, and wherein the past output data comprises decisions by the first AI platform that were associated with at least one of providing a risk analysis, operating a computing device, providing a marketplace recommendation, providing a search result, or operating a vehicle.

7. The system of claim 1, wherein the determining the first classifier and the first recommendation comprises determining a plurality of classifiers and a plurality of recommendations, and wherein the training the second platform AI model is further based on the plurality of classifiers and the plurality of recommendations.

8. The system of claim 7, wherein the plurality of recommendations is associated with intents predicted based on customer data associated with a payment provider service by at least the simulated AI model.

9. The system of claim 1, wherein the simulated AI model is further based on additional past input data by at least one second user to the first AI platform and additional past output data by the first AI platform in response to the additional past input data.

10. The system of claim 9, wherein prior to the training the second platform AI model, the operations further comprise:
    removing identification data of the at least one second user from the additional past input data and the additional past output data.

11. The system of claim 1, wherein the request to transition from the first AI platform to the second AI platform comprises a request to migrate an AI functionality to the second AI platform based on a use of an AI service provided by the second AI platform.

12. A method comprising:
    receiving, from a first computing device, a request to transition from a first artificial intelligence (AI) platform previously used by a first user of the first computing device to a second AI platform;
    in response to receiving the request, determining a simulated AI model for the first AI platform based on past input data to the first AI platform and past output data by the first AI platform in response to the past input data;
    determining, based on the simulated AI model, a first classifier and a first recommendation based on the first classifier for the second AI platform; and
    training a second platform AI model with the second AI platform using the first classifier and the first recommendation.

13. The method of claim 12, wherein the receiving the request and the training the second platform AI model is performed via an orchestration layer that is in communication with the first AI platform and the second AI platform, and wherein prior to the receiving the request, the method further comprises:
    building, via the orchestration layer, the simulated AI model over a time period based on the past input data and the past output data.

14. The method of claim 13, wherein the building is further based on user interactions by the first user with the first AI platform over the time period, and wherein the user interactions comprise decisions made by the first AI platform using a first platform AI model trained based on the past input data.

15. The method of claim 13, wherein the orchestration layer further manages additional user interactions between a plurality of AI platforms including the first AI platform and the second AI platform, and wherein the orchestration layer is further in communication with a data center comprising a plurality of simulated AI models for the plurality of AI platforms.

16. The method of claim 12, wherein the training the second platform AI model further comprises:
    determining at least one additional simulated AI model associated with at least one additional AI platform; and
    providing additional feature training for a portion of the second platform AI model using the at least one additional simulated AI model.

17. The method of claim 12, wherein the past input data comprises at least one of text data, media data, operational data, a search request, or a data query, and wherein the past output data comprises decisions by the first AI platform that were associated with at least one of providing a risk analysis, operating a computing device, providing a marketplace recommendation, providing a search result, or operating a vehicle.

18. The method of claim 12, wherein the determining the first classifier and the first recommendation comprises determining a plurality of classifiers and a plurality of recommendations, and wherein the training the second platform AI model is further based on the plurality of classifiers and the plurality of recommendations.

19. The method of claim 18, wherein the plurality of recommendations is associated with intents predicted based on customer data associated with a payment provider service by at least the simulated AI model.

20. A non-transitory machine-readable medium having stored thereon machine-readable instructions executable to cause a machine to perform operations comprising:
    receiving, from a first computing device, a request to transition from a first artificial intelligence (AI) platform previously used by a first user of the first computing device to a second AI platform;
    in response to receiving the request, determining a simulated AI model for the first AI platform based on past input data to the first AI platform and past output data by the first AI platform in response to the past input data;
    determining, based on the simulated AI model, a first classifier and a first recommendation based on the first classifier for the second AI platform; and
    training a second platform AI model with the second AI platform using the first classifier and the first recommendation.

* * * * *